(12) United States Patent
Blaha et al.

(10) Patent No.: US 8,090,906 B1
(45) Date of Patent: Jan. 3, 2012

(54) DYNAMIC PROCESSOR BANDWIDTH ALLOCATION IN RESPONSE TO ENVIRONMENTAL CONDITIONS

(75) Inventors: Greg A. Blaha, Lake Forest, CA (US); Kenny T. Coker, Corona, CA (US); Alan T. Meyer, Anaheim Hills, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 400 days.

(21) Appl. No.: 12/482,220

(22) Filed: Jun. 10, 2009

(51) Int. Cl.
*G06F 12/00* (2006.01)

(52) U.S. Cl. ............... 711/112; 711/156; 360/77.02; 360/77.05; 360/97.02; 369/43; 369/44.27; 369/44.32

(58) Field of Classification Search ............ 711/112, 711/156; 360/77.02, 77.05, 97.02; 369/43, 369/44, 27, 44.32
See application file for complete search history.

(56) References Cited

U.S. PATENT DOCUMENTS

| | | | |
|---|---|---|---|
| 5,832,005 A * | 11/1998 | Singh ..................... | 714/805 |
| 6,246,536 B1 | 6/2001 | Galloway | |
| 6,615,091 B1 * | 9/2003 | Birchenough et al. ......... | 700/96 |
| 6,662,297 B1 | 12/2003 | Boom et al. | |
| 6,741,530 B2 * | 5/2004 | Turner et al. .............. | 369/30.24 |
| 6,760,178 B2 * | 7/2004 | Shibata ..................... | 360/75 |
| 6,958,881 B1 | 10/2005 | Codilian et al. | |
| 6,963,524 B2 * | 11/2005 | Turner et al. .............. | 369/47.18 |
| 7,009,803 B2 | 3/2006 | Sharma et al. | |
| 7,038,988 B2 * | 5/2006 | Turner et al. .............. | 369/53.37 |
| 7,061,467 B2 * | 6/2006 | Rosenberg ............... | 345/156 |
| 7,107,363 B2 | 9/2006 | Brown et al. | |
| 7,213,137 B2 | 5/2007 | Boom et al | |
| 7,437,728 B2 | 10/2008 | Stackhouse et al. | |
| 7,831,323 B2 * | 11/2010 | Weber et al. ............... | 700/96 |
| 2004/0073735 A1 | 4/2004 | Boom et al. | |
| 2008/0005749 A1 * | 1/2008 | Mead et al. ................ | 719/321 |
| 2008/0294758 A1 | 11/2008 | Xiao et al. | |

FOREIGN PATENT DOCUMENTS

WO 2006051519 A3 5/2006

\* cited by examiner

*Primary Examiner* — Stephen Elmore

(57) ABSTRACT

Servo-related tasks are performed at a first processor in a disk drive. A signal indicative of an environmental condition is received at the first processor, and code associated with the environmental condition is identified based at least in part on the signal. A second processor in the disk drive is caused to execute the code associated with the environmental condition, and a responsive task is performed at the first processor based at least in part on the executed code associated with the environmental condition.

26 Claims, 5 Drawing Sheets

DYNAMIC PROCESSOR BANDWIDTH ALLOCATION IN RESPONSE TO ENVIRONMENTAL CONDITIONS

BACKGROUND

Magnetic disk drives are conventionally designed to store large volumes of data on a plurality of disks mounted on a spindle assembly. Typically, each disk includes two disk surfaces capable of storing data. On each disk surface, user data is divided into groups of sectors and stored in concentric circular tracks located between an outside diameter and an inside diameter of the disk. Embedded servo information is recorded in servo sectors located in radially continuous narrow wedges along the disk surface. Conventionally, a single microprocessor is included in the disk drive to control certain disk drive operations.

Recently, however, some disk drives have begun to incorporate multiple microprocessors in order to improve performance while lowering memory requirements, die size requirements and power consumption. In one typical implementation, a disk drive may include two microprocessors (e.g., a servo processor and a host processor), each dedicated to executing different disk drive tasks. Since each microprocessor has fewer disk drive tasks to perform, they may each be slower and less powerful than a single microprocessor would need to be for the same disk drive. Unfortunately, although the multiple microprocessors may be designed to meet the requirements of the disk drive under normal operating conditions, they may, in some implementations, lack sufficient bandwidth to timely process relatively infrequent events (e.g., to timely process and respond to changing environmental conditions).

There is therefore a need in the art for enabling multiple microprocessors to timely respond to environmental conditions.

DETAILED DESCRIPTION

Figure 1:
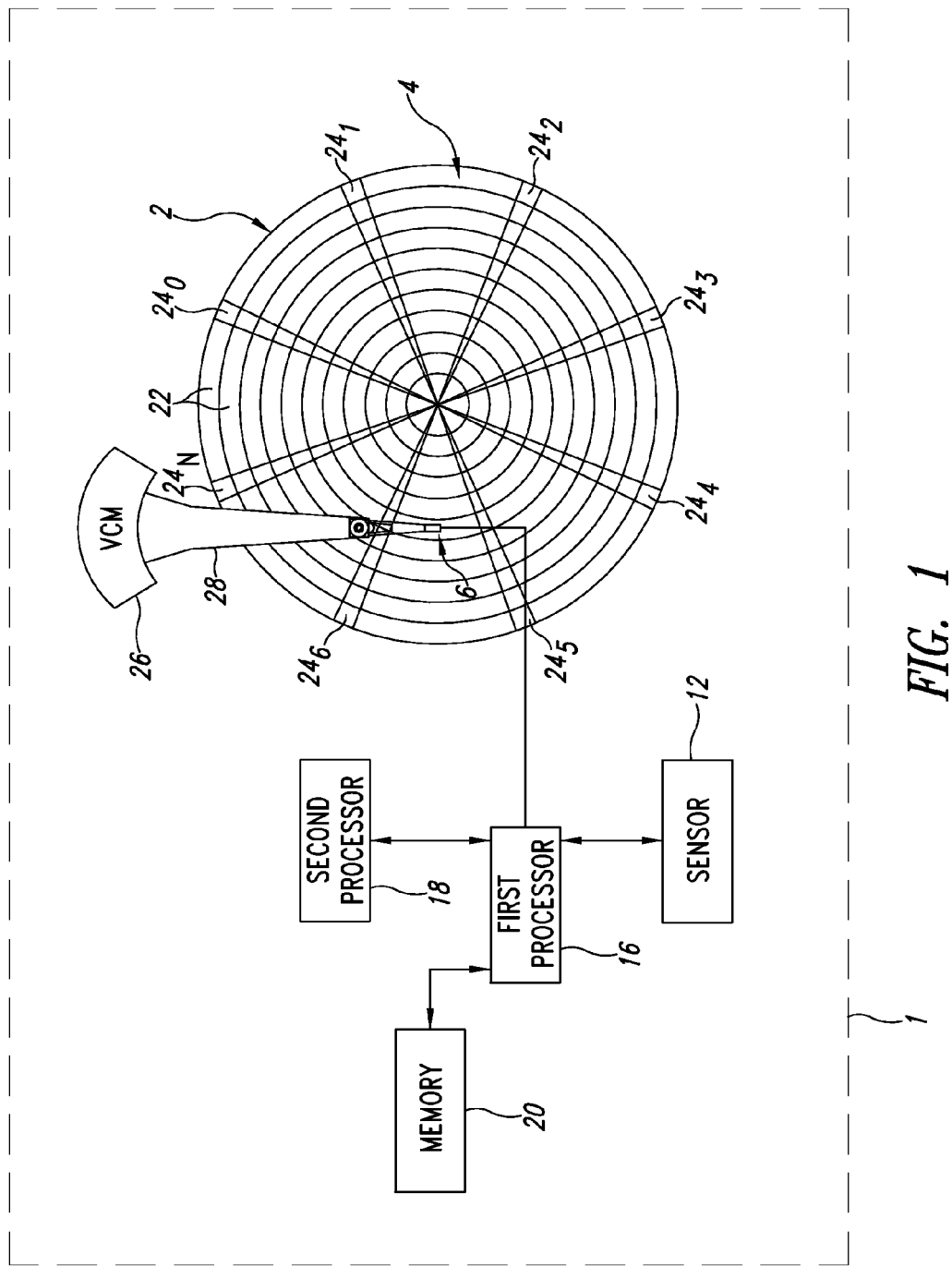
FIG. 1 is a schematic view generally illustrating an example disk drive, according to one illustrated embodiment.

Referring to FIG. 1, according to one embodiment, disk drive 1 comprises a disk 2 having a disk surface 4, and a head 6 actuatable over the disk surface 4 and operable to write to and read from the disk surface 4. The disk drive 1 further includes a sensor 12 configured to generate a signal indicative of an environmental condition. In one embodiment, a first processor 16 is operable to perform servo-related tasks and execute instructions, and is coupled to and configured to receive the signal from the sensor 12. A second processor 18 in the disk drive 1 may be coupled to the first processor 16. The disk drive 1 further includes a computer-readable memory 20 having instructions stored thereon that are executable by the first processor 16 in order to cause the first processor 16 to respond to the environmental condition by: identifying code associated with the environmental condition based at least in part on the signal; causing the second processor 18 to execute the code associated with the environmental condition; and performing a responsive task based at least in part on the executed code associated with the environmental condition. These components and the acts performed in the disk drive 1 are described in greater detail below.

As illustrated, the disk drive 1 comprises a magnetic disk drive, and the methods described herein will be described in terms of such a disk drive. However, the methods, circuitry and firmware described herein may also be applied to and/or implemented in other disk drives, including, e.g., optical or magneto-optical disk drives.

The disk 2 may comprise any of a variety of magnetic or optical disk media. As illustrated, the disk 2 includes a disk surface 4, as well as an opposite disk surface not visible in FIG. 1. In one embodiment, the disk surface 4 comprises a plurality of generally concentric tracks 22 defined at least in part by a plurality of servo sectors $24_{O-N}$. In other embodiments, more disks may, of course, be included in the disk drive 1, and different disk surfaces of these disks may be used for data storage.

The head 6 is actuatable over the disk surface 4 and is operable to write to and read from the disk surface 4. In one embodiment, the head 6 is a magnetic recording head and includes a transducer (not illustrated). The transducer may include a writer and a read element. In magnetic recording applications, the transducer's writer may be of a longitudinal, tunneling or perpendicular design, and the read element of the transducer may be inductive or magneto-resistive. In optical or magneto-optical recording applications, the head 6 may include an objective lens and an active or passive mechanism for controlling a separation of the objective lens from the disk surface 4.

As illustrated, the disk drive 1 may further include a voice coil motor (VCM) 26 for rotating one or more actuator arms 28 about a pivot in order to actuate the head 6 at different positions over the disk surface 4. Of course, other actuating mechanisms may also be used to move the head 6 relative to the disk surface 4.

The disk drive 1 also includes a sensor 12, which may comprise any of a variety of components located entirely within or extending at least partially outside the disk drive 1 and configured to generate a signal indicative of an environmental condition. The environmental condition may comprise any characteristic of the disk drive's environment. In one embodiment, the sensor 12 may comprise at least one accelerometer configured to generate a signal indicative of rotational vibration. For example, the sensor 12 may include three accelerometers oriented along orthogonal axes in order to sense the rotational vibration. In another embodiment, the sensor 12 may be configured to generate a signal indicative of at least one of an external shock, air pressure and temperature. For example, the sensor 12 may comprise an accelerometer configured to sense an external shock, a barometer configured to detect air pressure, and/or a temperature sensor (e.g., a thermocouple) configured to sense temperature. In still other embodiments, different sensors may be used to detect other environmental conditions.

The sensor 12 may generate any of a variety of signals indicative of the environmental condition. In one embodiment, the sensor 12 may generate an analog signal based at least in part upon the environmental condition. In another embodiment, the sensor 12 may generate a digital signal encoding information indicative of the environmental condition. For example, the sensor 12 may normalize and interpret signals from one or more accelerometers and may then generate a signal indicative of a shock to the disk drive 1 in a digital format.

The disk drive 1 includes a first processor 16 and a second processor 18, as illustrated. In one embodiment, the first processor 16 may be operable to perform servo-related tasks, and the second processor 18 may be operable to perform "host-core" tasks. In some embodiments, the disk drive 1 may include more than two processors, and disk drive tasks may be divided among the multiple processors in a variety of ways.

The first processor 16 may be operable to perform a variety of servo-related tasks based upon code stored in the computer-readable memory 20. In one embodiment, the servo-related tasks include at least one of decoding servo fields, maintaining spindle speed, managing disk drive sensors (including, e.g., the sensor 12), track seeking and track following. The servo-related tasks performed by the first processor 16 may also include, inter alia, controlling park, spin-up and spin-down operations, in addition to the servo-related tasks described above. In still other embodiments, other servo-related tasks may be handled by the first processor 16.

As illustrated, the first processor 16 may be coupled to and configured to receive signals from the sensor 12. In some embodiments, the first processor 16 may be indirectly coupled to the sensor 12. For example, analog-to-digital converters and/or signal conditioning hardware may be coupled between the sensor 12 and the first processor 16. As another example, even more complex circuitry may be coupled between the sensor 12 and the first processor 16. This circuitry may pre-process signals from the sensor 12 and may serve as an interface between the sensor 12 and the firmware executed by the first processor 16. Of course, in other embodiments, the first processor 16 may be directly coupled to the sensor 12 and may be configured to receive signals indicative of environmental conditions directly therefrom.

The first processor 16 may comprise any of a variety of microprocessors, such as an ARM microprocessor. In some embodiments, the first processor 16 may be formed on the same die as the second processor 18. However, in other embodiments, the first processor 16 and the second processor 18 may be formed on separate dies.

The second processor 18 may be coupled to the first processor 16 and may be operable to perform other tasks based upon stored code. In one embodiment, the second processor 18 may also be coupled to the computer-readable memory 20 and may be configured to perform tasks by executing computer-readable instructions stored on the computer-readable memory 20. In another embodiment, logically and/or physically separate computer-readable memory may be coupled to the second processor 18.

The second processor 18 may be configured to perform a variety of tasks. In one embodiment, the second processor 18 may perform "host core" tasks. For example, the second processor 18 may be configured to execute a disk drive operating system. Other tasks performed by the second processor 18 may include, inter alia, sorting disk access requests, determining a next command to be performed (e.g., in accordance with a rotational position optimization algorithm), decoding/encoding data commands, managing data flow, maintaining cache and cache coherency, managing servo background activity, etc. In other embodiments, other tasks may be handled by the second processor 18.

The second processor 18 may comprise any of a variety of microprocessors, such as an ARM microprocessor. In one embodiment, the first processor 16 and the second processor 18 may have very similar configurations/architectures. However, in other embodiments, they may be quite different.

The computer-readable memory 20 may comprise any type of volatile or nonvolatile computer-readable memory, such as dynamic random access memory (DRAM) or flash memory, or combinations thereof. As illustrated, the computer-readable memory 20 may comprise a memory module separate and distinct from the disk surface 4. However, in some embodiments, various instructions executable by the first processor 16 (and/or the second processor 18) may be stored on the disk surface 4.

The computer-readable memory 20 may have instructions stored thereon that are executable by the first processor 16. In one embodiment, these instructions may cause the first processor 16 to identify code associated with an environmental condition based at least in part on a signal from the sensor 12. For example, in one embodiment, the first processor 16 may receive a signal indicative of rotational vibration and may identify code associated with the rotational vibration for subsequent execution. In another embodiment, the first processor 16 may receive a signal indicative of an external shock and may identify code associated with this shock.

In one embodiment, the first processor 16 may simply receive the signal from the sensor 12 and may identify code based on that signal. For example, code associated with the current temperature may be identified and then executed when the first processor 16 receives a signal from a temperature sensor. In another embodiment, the first processor 16 may pre-process the signal indicative of the environmental condition and may identify code associated with the environmental condition based at least in part on this pre-processing. For example, if the signal is indicative of rotational vibration, the first processor 16 may first pre-process the signal in order to determine if the rotational vibration has reached a level at which it may impact drive performance. In yet another embodiment, the second processor 18 may be responsible for pre-processing the signal indicative of the environmental condition. The result of this pre-processing may then be transmitted to the first processor 16 so that the first processor 16 may identify additional code associated with the environmental condition.

Based on the instructions stored on the computer-readable memory 20, the first processor 16 may then cause the second processor 18 to execute the code associated with the environmental condition. For example, if rotational vibration is detected, the first processor 16 may cause the second processor 18 to process the signal indicative of the rotational vibration (before or after pre-processing) in accordance with a rotary acceleration feed forward (RAFF) algorithm to generate a rotary control signal. This rotary control signal may then be used during servoing to compensate for the rotational vibration.

The first processor 16 may cause the second processor 18 to execute the code associated with the environmental condition in a variety of ways. In one embodiment, the first processor 16 may send a command to the second processor 18 to cause the second processor 18 to execute the code associated with the environmental condition. Such a command may, for example, symbolically direct the second processor 18 to the code. In another embodiment, the first processor 16 may set a dedicated interrupt to cause the second processor 18 to execute the code. In some embodiments, the first processor 16 may send information indicative of the environmental condition to the second processor 18. However, in other embodiments, the second processor 18 may also be coupled (directly or indirectly) to the sensor 12 and may be configured to receive and process signals therefrom.

Based on the instructions stored on the computer-readable memory 20, the first processor 16 may then perform a responsive task based at least in part on the executed code associated with the environmental condition. Any of a variety of responsive tasks may be performed. In an embodiment in which the second processor 18 has generated a rotary control signal, the VCM 26 may be controlled by the first processor 16 based at least in part on a position error signal and the rotary control signal. Thus, subsequent servoing may compensate for rotational vibrations based at least in part upon the rotary control signal. In another embodiment, wherein an air pressure is detected, the first processor 16 may adjust a dynamic fly-height of the head 6 based at least in part on code executed by the second processor 18. In yet another embodiment, wherein a temperature is detected, the first processor 16 may adjust the limits on the current applied to the VCM 26 during servoing based at least in part on code executed by the second processor 18.

In one embodiment, the computer-readable memory 20 may also have stored thereon instructions that cause the first processor 16 to determine an available bandwidth of the first processor 16. The instructions may further cause the first processor 16 to determine whether or not to cause the second processor 18 to execute the code associated with the environmental condition based at least in part on the available bandwidth of the first processor 16. For example, if it is determined that the first processor 16 has sufficient bandwidth to execute the code without adversely impacting other servo-related tasks, then it may execute the code itself and not cause the second processor 18 to do so. In other embodiments, the first processor 16 may also determine an available bandwidth of the second processor 18 and may base the decision to offload execution of the code on that factor as well.

In some embodiments, the servo-related tasks performed by the first processor 16 are extremely time-sensitive, and failure to complete these tasks in a timely fashion may result in slipped revolutions. In such embodiments, it may be desirable to offload code related to environmental conditions (which may comprise exception processing) to the second processor 18. Once the second processor 18 has executed the code related to the environmental condition, the first processor 16 may then use the results from that code when performing certain servo-related tasks.

Figure 2:
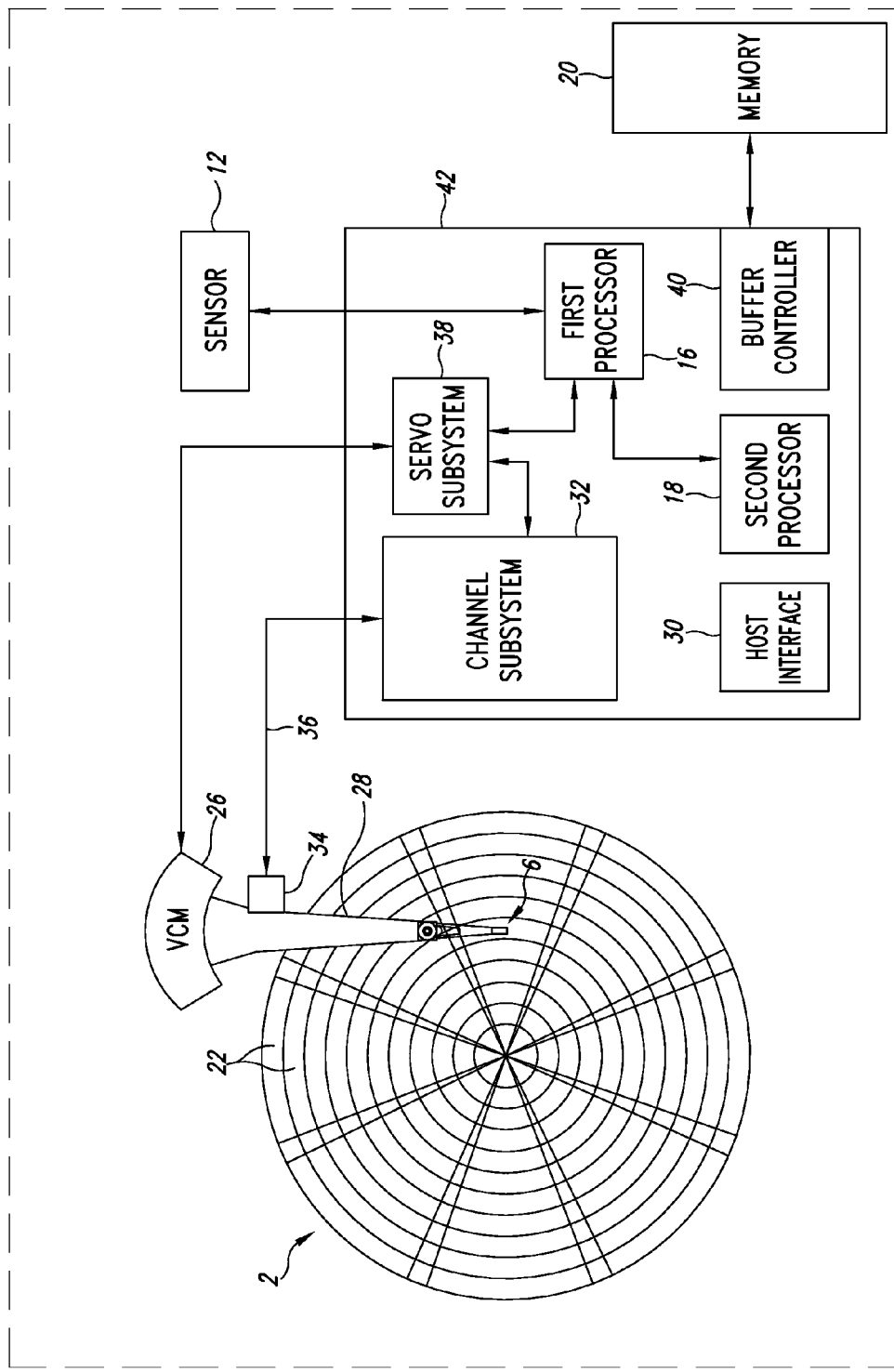
FIG. 2 is a schematic view illustrating in greater detail the example disk drive of FIG. 1, according to one illustrated embodiment.

Referring to FIG. 2, additional circuitry for controlling various functions of the disk drive 1 is illustrated in greater detail. In one embodiment, the disk drive 1 includes a host interface 30 configured to receive disk access commands from a host computer (not shown) coupled to the disk drive 1. In addition, the host interface 30 may receive a variety of other commands and data from and transmit status and data to the host computer. The host interface 30 may comply with any of a number of electrical engineering standards. In one embodiment, the host interface 30 may include a serial interface, such as a Serial Advanced Technology Attachment (SATA) interface or a Serial Attached Small Computer System Interface (SAS). In another embodiment, a parallel interface may be used, such as an Advanced Technology Attachment/Integrated Drive Electronics (ATA/IDE) interface or a Small Computer System Interface (SCSI).

The disk drive 1 may also include a channel subsystem 32 (sometimes referred to as a "read channel"). The channel subsystem 32 may be coupled to a preamplifier 34 via a plurality of read and write lines 36. The preamplifier 34 may be located on the actuator 28. During a read operation, the preamplifier 34 may amplify an analog signal detected by the head 6 in order to achieve a signal level that can be processed by the channel subsystem 32. The channel subsystem 32 may then receive the amplified signal via at least one of the lines 36 and further amplify, filter and convert the analog pulses into digital data that is output to a controller (not shown). During a write operation, the channel subsystem 32 may receive digital data from the controller and forward logical signals representative of this digital data to the preamplifier 34 via the lines 36. As is well known in the art, the channel subsystem 32 may be armed by firmware for such read and write operations.

The disk drive 1 may further include a servo subsystem 38. In one embodiment, the servo subsystem 38 receives a position signal via the preamplifier 34 and the channel subsystem 32 and performs calculations to determine a current position of the head 6 over the disk surface 4. The servo subsystem 38 and the first processor 16 may then use these calculations in order to control the VCM 26, and thereby control the position of the head 6. The servo subsystem 38 and the first processor 16 may perform seek operations in order to move the head 6 from one track to another track and may perform track following operations in order to keep the head 6 tracking over the same track 22.

The disk drive 1 may further comprise a buffer controller 40 directly coupled to the computer-readable memory 20. The buffer controller 40 may arbitrate access to the computer-readable memory 20 by other disk drive components.

As illustrated, many of the circuit components may be incorporated into a system on a chip (SoC) 42. Thus, a single piece of silicon may incorporate the functionality of many of the above-described components. In other embodiments, the circuit components described herein may be implemented on a printed circuit board as separate elements.

Figure 3:
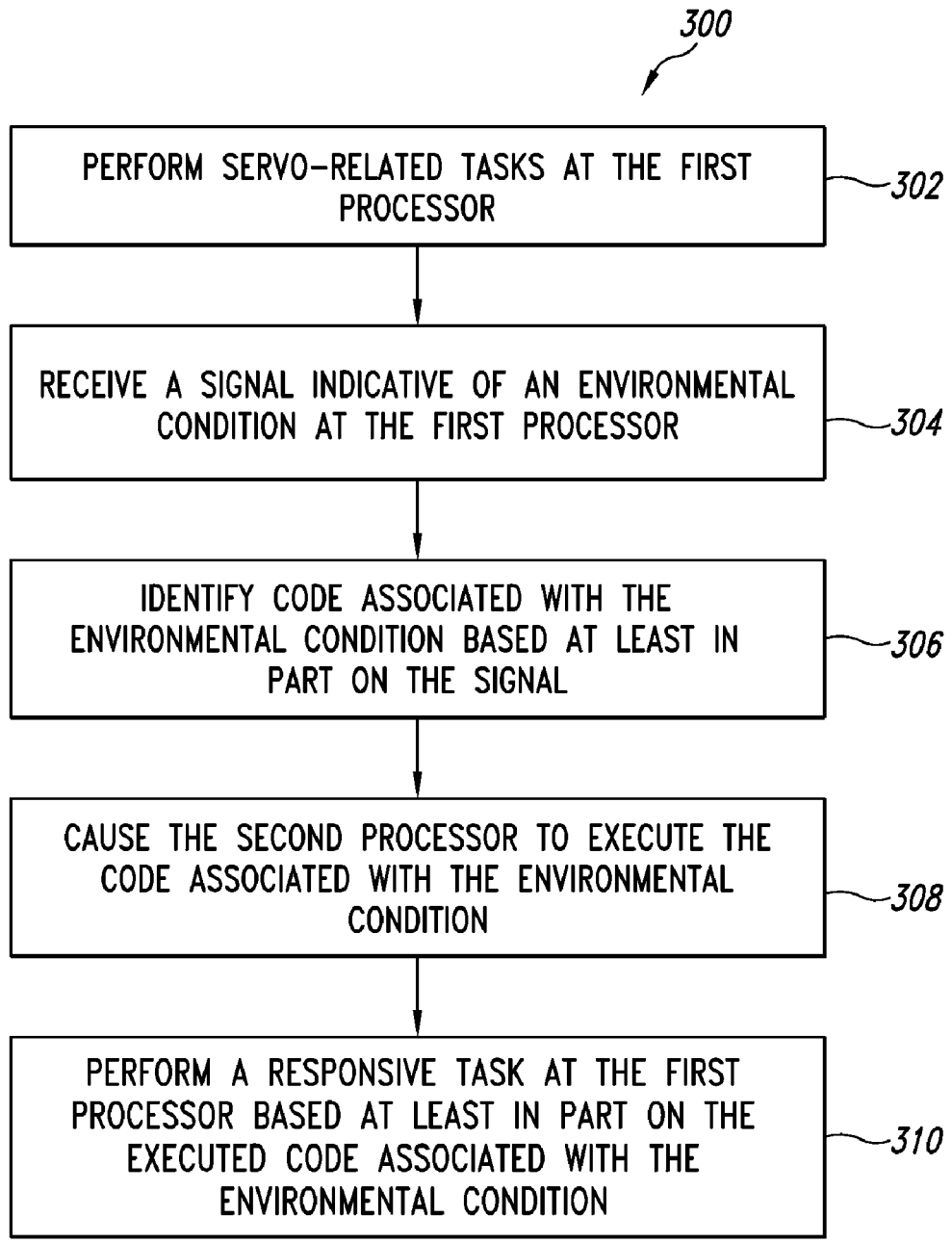
FIG. 3 is a flow chart illustrating one method of operating a disk drive having a first processor and a second processor, according to one illustrated embodiment.

FIG. 3 illustrates a flow diagram for a method 300 of operating a disk drive, according to one embodiment. This method 300 will be discussed in the context of the disk drive 1 of FIGS. 1 and 2 with additional reference to FIGS. 4 and 5. However, the acts disclosed herein may be executed in a variety of different disk drives, in accordance with the described method.

As described herein, all of the acts comprising the method 300 may be orchestrated by the first processor 16 based at least in part on computer-readable instructions stored in the computer-readable memory 20. In other embodiments, a hardware implementation of all or some of the acts of the method 300 may be used instead. In addition, some of the acts of the method 300 may also be performed by the second processor 18 or additional processors in the disk drive 1.

At act 302, servo-related tasks are performed at the first processor 16. As described above, such servo-related tasks may include at least one of decoding servo fields, maintaining spindle speed, managing disk drive sensors, track seeking and track following. In some embodiments, all of these servo-related tasks may be performed at the first processor 16, and the first processor 16 may be considered a dedicated servo processor.

Figure 4:
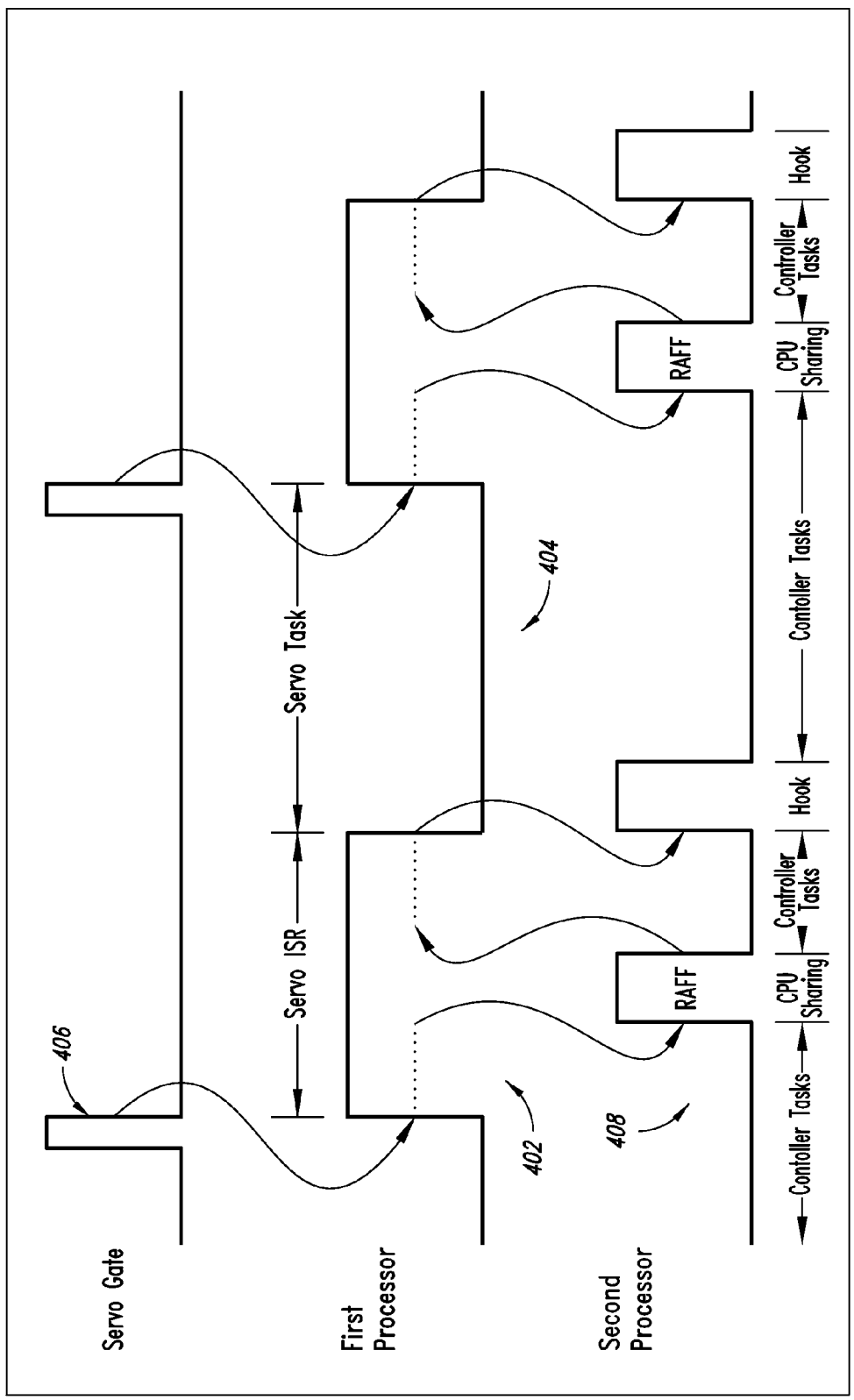
FIG. 4 is a schematic diagram of code associated with an environmental condition being executed by a second processor, according to one illustrated embodiment.

FIG. 4 illustrates the periods of time used by the first processor 16 to perform different servo-related tasks. As illustrated, the first processor 16 may perform a first set of servo-related tasks 402 in response to a servo interrupt service request (ISR). The first processor 16 may then perform another set of servo-related tasks 404 when not responding to the servo ISR. A servo gate 406 may trigger the servo ISR, as illustrated.

At act 304, a signal indicative of an environmental condition is received at the first processor 16. As described above, any of a variety of signals may be received. In one embodiment, the first processor 16 may be coupled to a sensor 12, and the sensor 12 may generate the signal received at the first processor 16.

In one embodiment, the signal may comprise a signal indicative of rotational vibration received from at least one accelerometer. In another embodiment, the signal may comprise a signal indicative of at least one of an external shock, air pressure and temperature.

At act 306, code associated with the environmental condition is identified based at least in part on the signal. In one embodiment, the first processor 16 performs this identification. However, in other embodiments, a second processor 18 or other circuitry may make the identification.

In one embodiment, this identification may include pre-processing the signal indicative of the environmental condition at the first processor 16 and then identifying the code associated with the environmental condition based at least in part on the pre-processing. In other embodiments, no pre-processing need be done.

At act 308, the second processor 18 is caused to execute the code associated with the environmental condition. In one embodiment, the first processor 16 may cause the second processor 18 to execute the code. However, in other embodiments, another processor or separate hardware circuitry may cause the second processor 18 to execute the code.

The second processor 18 may execute any of a variety of code. In one embodiment, the second processor 18 may process a signal indicative of rotational vibration in accordance with a RAFF algorithm to generate a rotary control signal. As illustrated in FIG. 4, for example, RAFF code 408 may be executed by the second processor 18 among controller tasks performed at the second processor 18. The results generated by the RAFF code 408 may then be returned to the firmware executing on the first processor 16.

The handoff between the first processor 16 and the second processor 18 may be performed in a variety of ways. In one embodiment, the first processor 16 issues a command to the second processor 18 causing the second processor 18 to execute the code associated with the environmental condition. In another embodiment, the first processor 16 sets a dedicated interrupt causing the second processor 18 to execute the code associated with the environmental condition.

Figure 5:
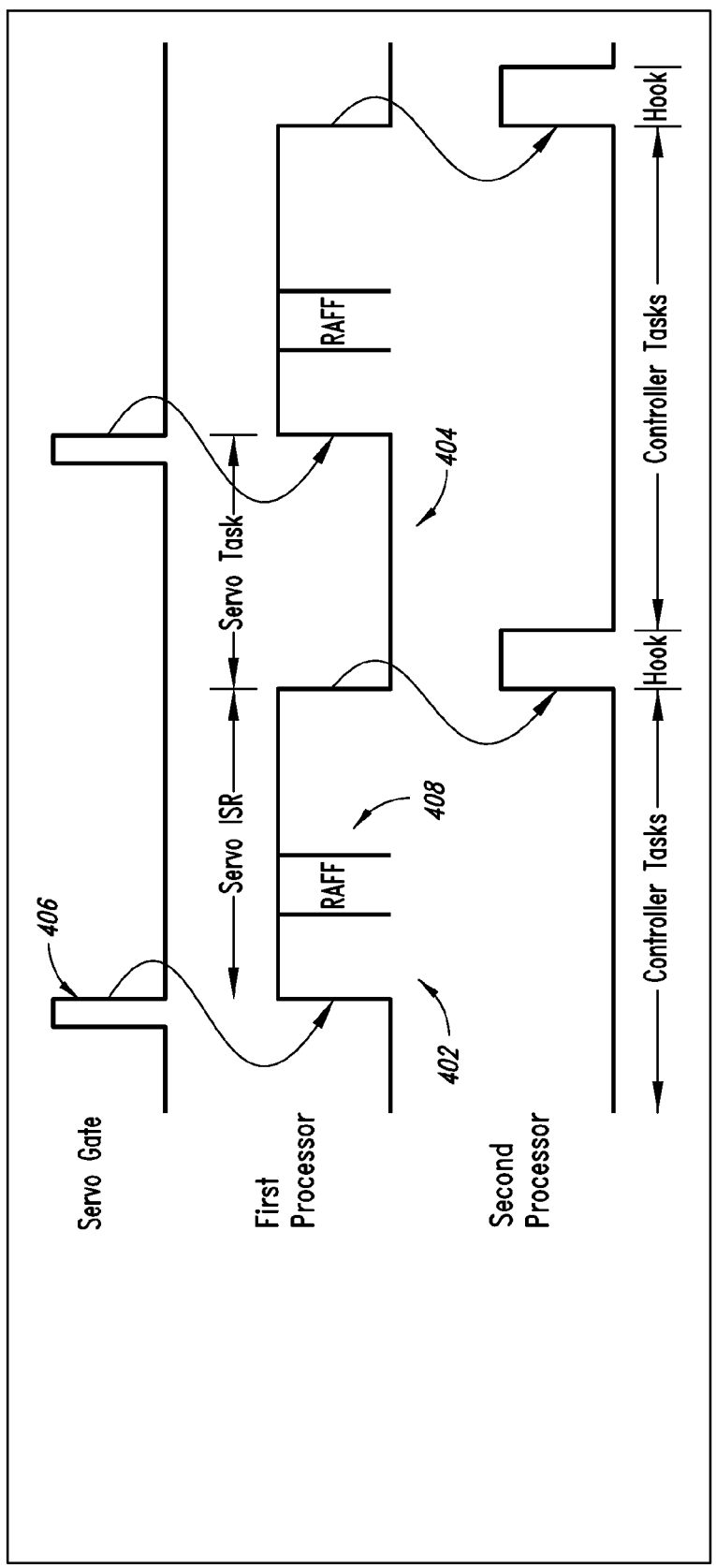
FIG. 5 is a schematic diagram of code associated with an environmental condition being executed by a first processor, according to one illustrated embodiment.

As described above, an available bandwidth of the first processor 16 may also be determined. It may then be determined whether or not to cause the second processor 18 to execute the code associated with the environmental condition based at least in part on the available bandwidth of the first processor 16. For example, if the first processor 16 has sufficient bandwidth to execute the code associated with the environmental condition, then the first processor 16 may execute the code itself. Such a scenario is illustrated in FIG. 5, wherein the first processor 16 executes the RAFF code 408 itself.

At act 310, a responsive task is performed at the first processor 16 based at least in part on the executed code associated with the environmental condition. Any of a number of tasks may be performed based upon the executed code. In one embodiment, the first processor 16 may adjust a dynamic fly-height of the head 6 based at least in part on the executed code. In another embodiment, the VCM 26 may be controlled by the first processor 16 based at least in part on a position error signal and a rotary control signal generated by the second processor 18.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

We claim:

1. A method of operating a disk drive having a first processor and a second processor, the method comprising:
   performing servo-related tasks at the first processor;
   receiving a signal indicative of an environmental condition at the first processor;
   identifying code associated with the environmental condition based at least in part on the signal;
   causing the second processor to execute the code associated with the environmental condition; and
   performing a responsive task at the first processor based at least in part on the executed code associated with the environmental condition.

2. The method of claim 1, wherein the servo-related tasks include at least one of decoding servo fields, maintaining spindle speed, managing disk drive sensors, track seeking and track following.

3. The method of claim 1, wherein receiving the signal indicative of the environmental condition includes receiving a signal indicative of rotational vibration from at least one accelerometer.

4. The method of claim 3, wherein causing the second processor to execute the code associated with the environmental condition includes causing the second processor to process the signal indicative of the rotational vibration in accordance with a rotary acceleration feed forward algorithm to generate a rotary control signal.

5. The method of claim 4, wherein performing the responsive task at the first processor based at least in part on the executed code includes controlling a voice coil motor based at least in part on a position error signal and the rotary control signal.

6. The method of claim 1, wherein receiving the signal indicative of the environmental condition includes receiving a signal indicative of at least one of an external shock, air pressure and temperature.

7. The method of claim 6, wherein performing the responsive task at the first processor based at least in part on the executed code includes adjusting a dynamic fly-height of a head of the disk drive based at least in part on the executed code.

8. The method of claim 1, wherein the first processor is configured to identify the code associated with the environmental condition.

9. The method of claim 8, wherein, after identifying the code associated with the environmental condition, the first processor issues a command to the second processor causing the second processor to execute the code associated with the environmental condition.

10. The method of claim 9, wherein the first processor sets a dedicated interrupt causing the second processor to execute the code associated with the environmental condition.

11. The method of claim 1, further comprising:
   determining an available bandwidth of the first processor; and determining whether or not to cause the second processor to execute the code associated with the environmental condition based at least in part on the available bandwidth of the first processor.

12. The method of claim 1, wherein identifying the code associated with the environmental condition includes pre-processing the signal indicative of the environmental condition at the first processor, and identifying the code associated with the environmental condition based at least in part on the pre-processing.

13. The method of claim 1, further comprising executing a disk drive operating system on the second processor.

14. A disk drive comprising:
a disk having a disk surface;
a head actuatable over the disk surface and operable to write to and read from the disk surface;
a sensor configured to generate a signal indicative of an environmental condition;
a first processor operable to perform servo-related tasks and execute instructions, the first processor coupled to and configured to receive the signal from the sensor;
a second processor coupled to the first processor; and
a computer-readable memory having instructions stored thereon that are executable by the first processor in order to cause the first processor to respond to the environmental condition by:
identifying code associated with the environmental condition based at least in part on the signal;
causing the second processor to execute the code associated with the environmental condition; and
performing a responsive task based at least in part on the executed code associated with the environmental condition.

15. The disk drive of claim 14, wherein the servo-related tasks include at least one of decoding servo fields, maintaining spindle speed, managing disk drive sensors, track seeking and track following.

16. The disk drive of claim 14, wherein the sensor comprises at least one accelerometer configured to generate a signal indicative of rotational vibration.

17. The disk drive of claim 16, wherein causing the second processor to execute the code associated with the environmental condition includes causing the second processor to process the signal indicative of the rotational vibration in accordance with a rotary acceleration feed forward algorithm to generate a rotary control signal.

18. The disk drive of claim 17, wherein performing the responsive task based at least in part on the executed code includes controlling a voice coil motor based at least in part on a position error signal and the rotary control signal.

19. The disk drive of claim 14, wherein the sensor is configured to generate a signal indicative of at least one of an external shock, air pressure and temperature.

20. The disk drive of claim 19, wherein performing the responsive task based at least in part on the executed code includes adjusting a dynamic fly-height of the head based at least in part on the executed code.

21. The disk drive of claim 14, wherein causing the second processor to execute the code includes sending a command from the first processor to the second processor to cause the second processor to execute the code associated with the environmental condition.

22. The disk drive of claim 21, wherein causing the second processor to execute the code includes setting a dedicated interrupt to cause the second processor to execute the code associated with the environmental condition.

23. The disk drive of claim 14, wherein the computer-readable memory has additional instructions stored thereon that are executable by the first processor in order to cause the first processor to:
determine an available bandwidth of the first processor; and
determine whether or not to cause the second processor to execute the code associated with the environmental condition based at least in part on the available bandwidth of the first processor.

24. The disk drive of claim 14, wherein identifying the code associated with the environmental condition includes pre-processing the signal indicative of the environmental condition, and identifying the code associated with the environmental condition based at least in part on the pre-processing.

25. The disk drive of claim 14, wherein the second processor is further configured to execute a disk drive operating system.

26. A disk drive having a first processor and a second processor, the disk drive comprising:
means for performing servo-related tasks at the first processor;
means for receiving a signal indicative of an environmental condition at the first processor;
means for identifying code associated with the environmental condition based at least in part on the signal;
means for causing the second processor to execute the code associated with the environmental condition; and
means for performing a responsive task at the first processor based at least in part on the executed code associated with the environmental condition.

\* \* \* \* \*